United States Patent [19]
Nyari

[11] Patent Number: 6,102,631
[45] Date of Patent: Aug. 15, 2000

[54] DRILL ATTACHMENT

[76] Inventor: Alexander Nyari, 60 Thompson Road, Upwey, Victoria 3158, Australia

[21] Appl. No.: 09/283,005

[22] Filed: Mar. 31, 1999

[51] Int. Cl.[7] .................................................. B23B 47/34
[52] U.S. Cl. ............................................ 408/67; 408/56
[58] Field of Search ........................................ 408/56, 67

[56] References Cited

U.S. PATENT DOCUMENTS

| | | |
|---|---|---|
| 3,850,254 | 11/1974 | Hirdes . |
| 3,881,838 | 5/1975 | Derbyshire ................................ 408/67 |
| 3,936,213 | 2/1976 | Kappel ..................................... 408/67 |
| 4,664,394 | 5/1987 | Theissig et al. . |
| 4,955,984 | 9/1990 | Cuevas ..................................... 408/67 |
| 5,160,230 | 11/1992 | Cuevas ..................................... 408/67 |
| 5,419,663 | 5/1995 | Psomas . |
| 5,772,367 | 6/1998 | Daniel ...................................... 408/67 |

FOREIGN PATENT DOCUMENTS

| | | |
|---|---|---|
| 3133066 A1 | 3/1983 | Germany . |
| 3129375 A1 | 4/1983 | Germany . |
| 3140776 A1 | 4/1983 | Germany . |
| 1593143 | 7/1981 | United Kingdom ..................... 408/67 |

*Primary Examiner*—Daniel W. Howell
*Attorney, Agent, or Firm*—Timothy J. Martin; Michael R. Henson; Mark H. Weygandt

[57] ABSTRACT

An open ended cylindrical drill attachment for attachment on a drill bit to collect dust while drilling. The drill attachment having an inner structure formed of vanes extending from inner walls to slightly offset the center, to form a central channel for receiving the drill bit and providing at least partial engagement so as to rotate the drill attachment and provide a vortex-like suction action and centrifugal entrapment. The drill attachment also acts as a drilled hole depth limiter.

11 Claims, 2 Drawing Sheets

DRILL ATTACHMENT

FIELD OF THE INVENTION

This invention relates to a drill attachment for assisting the user when drilling holes. It is particularly relevant to an electric masonry drill used in drilling vertical holes where dust or expelled material generally falls onto the face of the user and creates a health hazard or where the position or depth of the drill bit is of importance. However it can be used on other drills such as jewelry drills.

BACKGROUND OF THE INVENTION

In construction of modern buildings often there is a simplification of the structure of buildings to minimize the number of types of elements needed to create the building or to include fixtures and fittings within a building. This results in a need for repetitious drilling of holes throughout a ceiling whether that be a false ceiling of sound absorbent panels or a concrete ceiling that forms the floor of the story above. The resultant dust or expelled material can therefore be small fibrous material or concrete dust that is of such a size that it is harmful to the lungs and eyes of the person drilling and therefore is a health risk. In these more aware times of health and safety requirements for workers, it is important to minimize health risk factors and fulfill the legal requirements of providing a safe working environment.

In the use of electric drills it is known such as in DE 3140776 to limit the amount of airborne resultant dust or particulate material by providing an elongate longitudinally compressible elastic cylindrical body portion. This shroud is mounted around the drill body and extends coaxially along the drill bit to its end with the body portion able to engage the surface of the work piece being drilled. However this article has the disadvantage of requiring a mechanism that is able to attach to the drill body. Due to the many different types of drills and therefore drill bodies the attaching mechanism must either be a complex or cumbersome attachment piece or be made in a multitude of different sizes. Also, because the cylindrical body portion is not fixed in relative position around the drill bit, accidental drilling through the side of the cylindrical body portion can occur. Still further, since the apparatus encloses the entire drill bit, it is not possible to see how far the drill bit has extended into the work piece.

It is also known such as shown in U.S. Pat. No. 3,850,254 and DE 3129375 to make use of a vacuum system that also requires a mounting body fitting around the body of the drill and connecting to a shroud. The shroud extends around the drill bit. The mounting body includes not only a fitting for mounting around the drill body but a conduit that is in fluid communication with the shroud such that the conduit can connect to a vacuum system and thereby extract any dust collected in the shroud around the drill bit while the drill is in operation. This complex system requires the use of an external vacuum system, a large mounting body fitting around the drill body and a shroud covering the drill bit that makes it very difficult to estimate the depth that the drill bit has extended into the work piece.

Accordingly, there remains a need for an improved drill attachment which is more versatile and allows a user to estimate the depth of travel of a drill bit within the workpiece. There is a further need for a drill attachment which is relatively simple in construction while permitting efficient dust collection. The present invention is directed to meeting these needs.

SUMMARY OF THE INVENTION

It is therefore an object of this invention to provide an improved drill attachment that is readily useable with a range of drills and allows for estimation of the depth the drill bit has continued into the work piece.

It is also an object of the invention to provide a drill attachment that is efficient in its dust collection without the requirement of an external dust extraction system.

In accordance with the invention there is provided a drill attachment, for mounting on a drill bit of a power drill, having a substantially hollow closed attachment body with a mounting opening at a first longitudinal end for mounting on the drill bit and a larger dust catchment opening at the opposite second end with a channel extending therebetween able to receive the drill bit, the attachment body having an inner structure that extends inwardly to define at least a portion of the channel and enable the drill bit to extend substantially centrally out of the dust catchment opening.

The attachment body can be sized to provide at least partial engagement of the attachment body with the drill bit such that rotation of the drill bit causes movement of the attachment body relative to the drill bit. The mounting opening is usually formed of a resilient material to provide at least a partial grip on the drill bit. Also the use of such material allows for fitting on a number of standard drill bits in an industry dependent on the usual bolts or the like to be fitted.

The drill attachment in one form has the drill body being substantially hollow with a plurality of spaced vanes extending from the internal sides of the attachment body towards the central channel of the attachment body so as to aid alignment of the attachment body around the drill bit. The plurality of vanes extend longitudinally from internal sides of the attachment body partially into the central channel allowing a portion of each vane to engage the drill bit such that rotation of the drill bit causes movement of the attachment body relative to the drill bit. A side part of the vanes at or near the respective free end extends to the channel and is able to provide contact with the drill bit to assist rotation of the attachment body around the drill bit. Due to the free ends of the vanes located at or near the channel and having a degree of flexibility a resilient grip is provided on the drill bit without preventing rotation of the drill bit.

The drill attachment can have the vanes shaped and positioned to provide a vortex-like action to assist entrapment of dust particles.

The attachment body is preferably sized less than the drill bit extending out from the drill body and shaped such that the drill attachment is mounted on the drill bit with the open end of the attachment body having the large dust catchment opening being substantially planar and normal to the channel such that in use the second end can be aligned with the end of the drill bit and positioned on the surface to be drilled and rotation of the drill bit causes relative rotation of the attachment body and translational movement down the drill bit until in contact with the drill body.

In another form of the invention there is provided a drill attachment, for mounting on a drill bit of a power drill, including an attachment body having one substantially open end and a mounting opening at the opposite end sized to allow mounting of the attachment body around a drill bit and at least partial engagement of the drill bit with the mounting opening such that the attachment body can travel down the drill bit towards the drill body when the drill is in use to allow a defined length of drill bit penetrates the drilled surface. In this form, the drill attachment acts as a drilled hole depth limiter.

These and other objects of the present invention will become more readily appreciated and understood from a

DETAILED DESCRIPTION OF THE EXEMPLARY EMBODIMENTS

Figure 1:
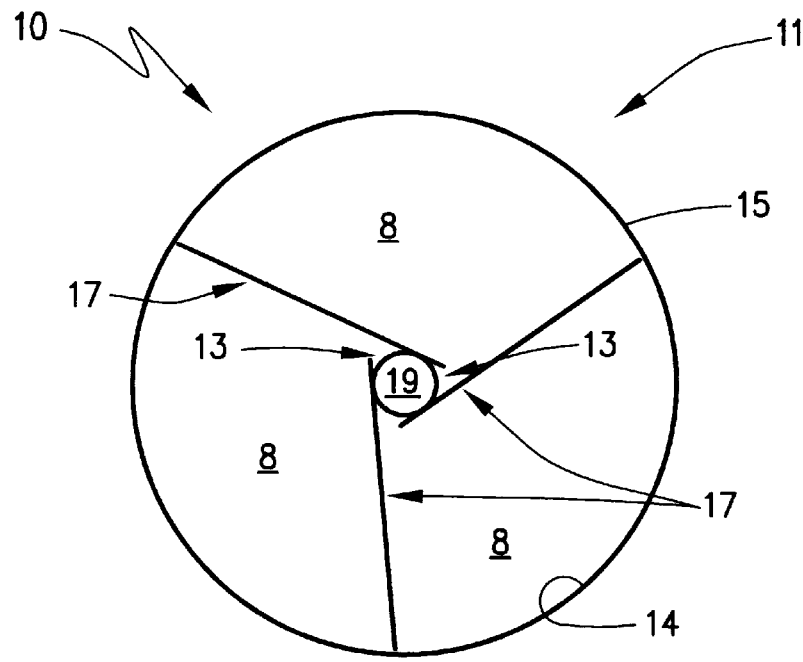
FIG. 1 is an overhead plan view of a drill attachment in accordance with a first exemplary embodiment of the invention.
Figure 2:
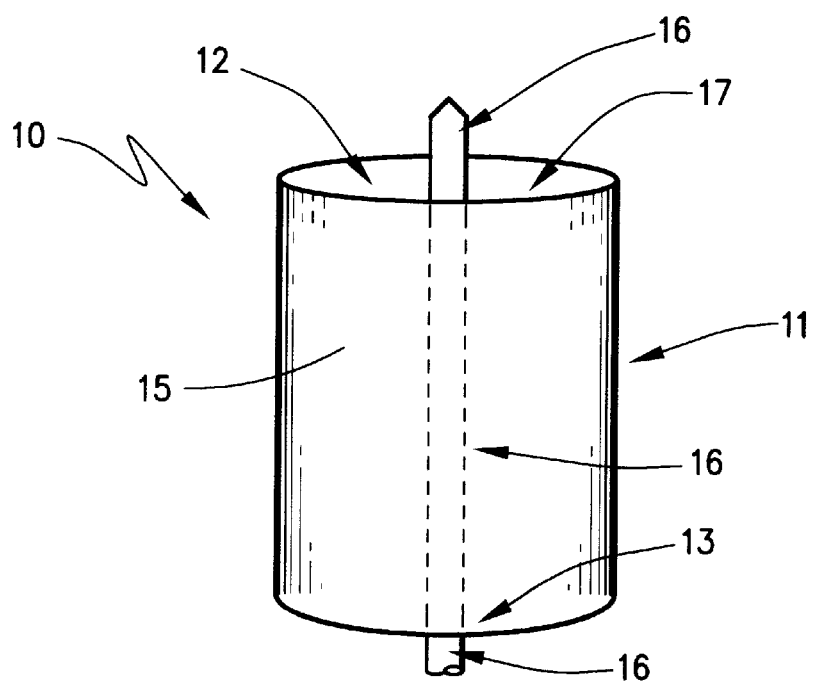
FIG. 2 is a perspective view of the drill attachment of FIG. 1 when mounted on a drill bit shown partially in phantom.

Referring to the drawings there is shown a drill attachment 10 including an attachment body 11 having a closed cylindrical sidewall 15 with an open end 12 at one end and being closed by a symmetrical convex curved surface at the opposite end except for a mounting opening 13 centrally and coaxially located relative to the cylindrical sidewall 15 of the attachment body 11. The mounting opening 13 is sized to fit around a standard drill bit 16. The mounting opening 13 is formed of resilient means such as a rubber material or a plastic material. With such material being softer than the material of the drill bit 16, it is able at least partially to engage the drill bit 16 while not being fixed in a particular mounted position on the drill bit 16.

Figure 4:
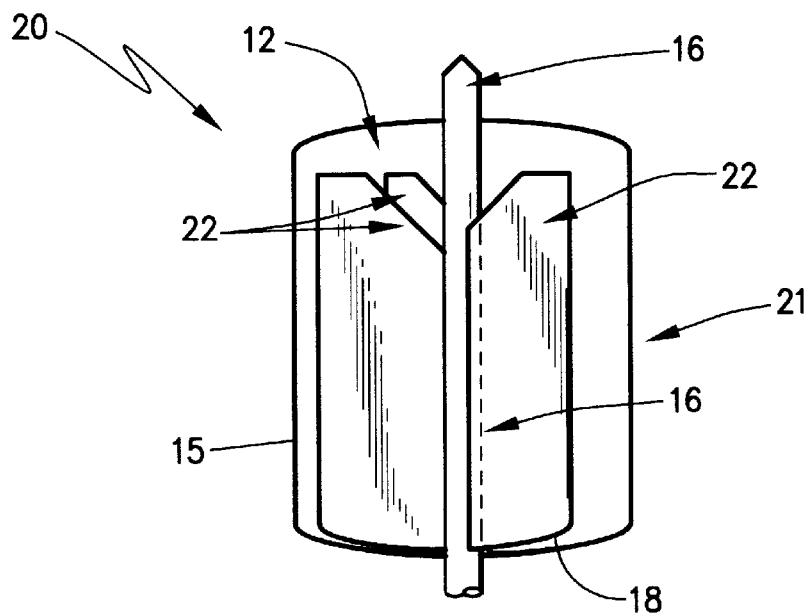
FIG. 4 is a side sectional view, along line IV—IV in FIG. 3, of the drill attachment when mounted on a drill bit.

The attachment body 11 further includes an inner structure of engagement means in the form of a plurality of vanes 17 extending from equispaced circumferential joins with the internal surface 14 of the attachment body's sidewall 15 towards, but slightly offset from, the center of the attachment body 11. The vanes 17 are planar sheets with a linear join to the internal sides that extends longitudinally from a spaced distance from the open end 12 of the attachment body 11 to the substantially closed inner concave curved base of the attachment body 11. As shown in FIG. 4, the planar sheet vanes 17 are substantially rectangular with a curved base 18 corresponding with the curved base of the attachment body 11. The vanes 17 also have a triangular cut out at the top of the free inner ends. The vanes 17 extend at a constant angle from the inner surface 14 to adjacent the center. Due to the constant length, spacing and angle of the vanes, the inner free ends of the vanes form a central cylindrical channel 19 extending from the mounting opening 13 to the open end 12. The channel 19 is able to receive a standard drill bit 16. The sides of the vanes 17 near the inner free ends respectively are able to engage the side of the drill bit 16 when such is mounted centrally and coaxially in the attachment body 11 through the mounting opening 13 and the channel 19 to protrude from the open end 12. Due to the plurality of the vanes 17 being equidistantly spaced around the internal circumference of the attachment body 11 and having a constant offset and length sufficient to extend adjacently the center of the attachment body 11, but not to contact the next circumferentially adjacent vane 17, there is a plurality of contact or engagement points at or near the end of each respective vane with the side of the drill bit 16 so as to maintain the attachment body 11 in a substantially coaxial orientation with the drill bit 16. This arrangement also enhances the engagement of the drill bit 16 to retain the attachment body 11 in relative position along the drill bit 16 and provide rotation of the attachment body 11 as the drill bit 16 rotates.

The drill attachment with the attachment body 11 is thereby able to be mounted on a drill bit of a power drill such as a masonry drill. The substantially hollow closed attachment body 11 with the mounting opening 13 at a first longitudinal end allows for initial insertion of the drill bit into the channel formed by the arrangement of the vanes. The open end 12 is able to act as a larger dust collection opening at the opposite second end around the protruding drill bit 16. In use the second end 12 can be aligned with the end of the drill bit and positioned on the surface to be drilled and rotation of the drill bit 16 causes relative rotation of the attachment body 11 and translational movement down the drill bit 16 until contacting with the drill body.

Figure 3:
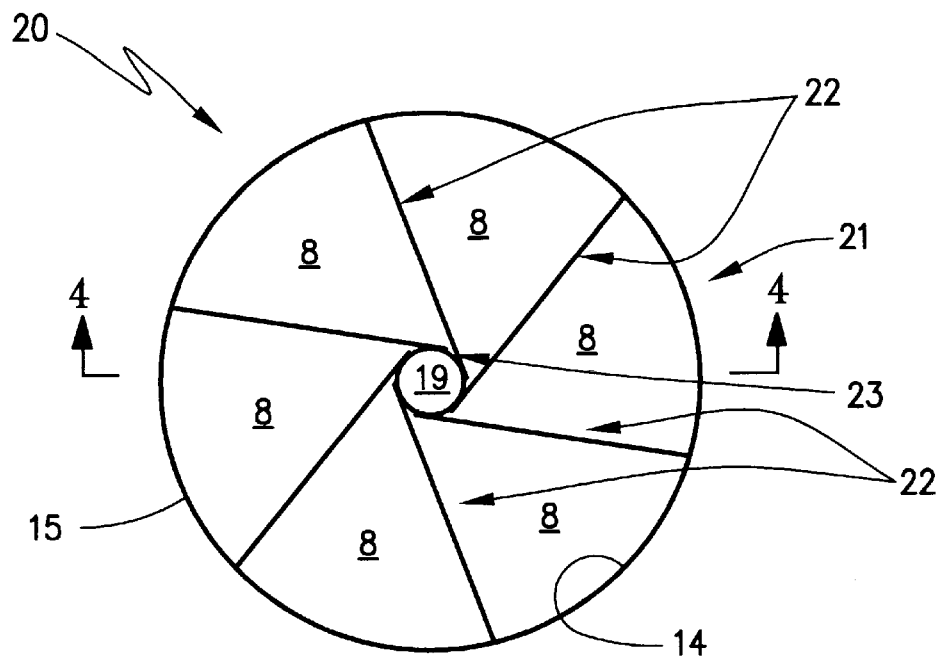
FIG. 3 is an overhead plan view of a second exemplary embodiment of a drill attachment according to the invention.

The vanes 17, 22 are shown in FIGS. 1 and 3 to have a left hand offset to the center of the attachment body 11, 21. Since a drill bit generally rotates in a single direction the type of engagement of the free distal ends of the vanes 17, 22 on the drill bit 16 will vary. In one direction the drill bit 16 will brush along sides of the vanes 17, 22 to provide a frictional engagement. In the opposite direction the drill bit 16 will also brush along the side of the vanes but possibly after "bumping" the end of the free distal ends of the vanes 17, 22. The latter appear to provide a larger frictional engagement of the drill bit 16 on the attachment body 11, 21.

The attachment body 11 is further sized to have an outer length of predetermined size relative to the drill bit 16 such that the distance between the length of the drill bit 16 extending from the drill body and the length of the attachment body 11 is the required depth of the hole to be drilled. In this form, the drill attachment 10 also operates as a depth of hole indicator or limiter.

The vanes 17, 22 are able to form the channel to hold the drill bit 16 and provide rotation and due to their shape and position provide a vortex-like action to draw in the dust and by centrifugal force trap the material in the vertices of the vanes and the inner walls of the attachment body. If different size holes are required for different anchors or threaded bolts, a relevant length of attachment body can be used or can be adjustable. Even if the depth of the hole is not required to correspond to the length between the exposed drill bit 16 and the attachment body 11, the attachment body 11 allows for estimation of the depth drilled. This is achieved by the attachment body 11 progressing down the drill bit 16 and the space between the bottom of the attachment body near the mounting opening 13 and the drill body is always visible to provide an indication to the user of the depth of the hole that has been drilled. In a preferable embodiment the attachment body 11 is transparent to allow sighting of the drill bit 16 within the attachment body 11 that further aids initial placement of the drill bit 16.

In use the attachment body 11 with its partial engagement of at least the mounting opening 13 and the respective free ends of the vanes 17 around the drill bit 16 provide a contact that allows coaxial alignment of the attachment body 11 around the drill bit 16. It also allows the attachment body 11 to rotate down the drill bit 16 while the drill is in operation. At the start of a drilling operation the top of the attachment body 11 having the open end 12 is placed at the same level as the point of the drill bit 16 and is positioned to engage the work piece to be drilled. Due to the engagement of the mounting opening 13 and the free ends of the vanes 17 to the drill bit 16, the attachment body 11 rotates at or less than the speed of rotation of the drill bit 16. The vanes 17 provide, at least initially, a vortex-like effect to draw the dust or material being expelled by the drill bit 16 from the workpiece into the attachment body 11. Further rotation of the drill bit 16 and relative orientation of the attachment body 11 allows for the attachment body 11 to travel down the drill bit 16 towards the drill body and thereby provide clearance for the end of the drill bit 16 as it moves into the workpiece being drilled. However, this further rotation and the spacing of the vanes 17 provide a centrifugal-like effect on the dust or material expelled by the drill bit such that it is directed towards the internal sides of the attachment body 11. The vanes 17 provide discrete compartments or collection regions 8 allowing for substantial entrapment of the dust or expelled material in the vertices of the internal circumferential sides of the attachment body 11 and the ends of the vanes 17 attached to the insides of the attachment body 11. This vortex-like entrapment and centrifugal like effect improves the collection capabilities of the drill attachment as a whole.

In FIGS. 3 and 4 there is shown a second embodiment of a drill attachment 20 according to the invention that has an attachment body 21 substantially the same as the attachment body 11 of the first embodiment but has a mounting opening 23 smaller than the mounting opening 13 of the first embodiment. The second embodiment performs in a similar manner to the first embodiment but the smaller mounting opening 23 is sized to receive a smaller diameter drill bit 16. To provide sufficient engagement of the smaller drill bit 16 more vanes 22 are included which are equidistantly spread around the circumference and extend from the inner sidewall 14 of attachment body 21 in a constant offset and extending closer to the center to allow the free distal ends of the vanes 22 to engage the smaller drill bit 16.

In operation there is often only two or three standard sized drill bits used in construction and therefore only two or three different sized attachment bodies 11 are needed. However the flexibility and number of the vanes 17, 22 could be selected to allow a particular attachment body 11, 21 to fit a range of sizes of drill bits 16.

In the field of masonry drilling in which masonry anchors are to be mounted in holes of some 30 to 40 millimeters, a masonry drill is used having a ball bearing lock in chuck with standard drill bits having outside diameters ranging from 6 millimeters to 16 millimeters. Although there is a range of diameters of drill bits, in the masonry category of drill bits the diameter to be inserted into the drill are standard at about 12 millimeters. The length of the drill bit 16 is usually of the order of 150 millimeters with about 40 millimeters being received in the drill chuck. A drill attachment of particular benefit for such use has a length of 75 millimeters and diameter of 55 millimeters. The vanes 22 extend some 20 millimeters inward at an angle of some 100 counterclockwise to the radial line. In use, by the relative dimensions the drill bit 16 is only able to extend some 35 millimeters into the material being drilled. The open end 12 with diameter 55 millimeters around the drill bit 16 is able to collect the majority of drill dust.

The description herein above shows that the present invention provides an improved machine and method that avoids most, if not all, the disadvantage of the prior art. Of course many modifications to the above described embodiment can be readily envisaged by persons skilled in the art. For example, the attachment body 11, 21 can be made of a number of frangible disconnectable parts which allows the user to select the length of the attachment body 11, 21 required for the length of the hole to be drilled such that the length of the hole is the same as the difference between the length of the drill bit 16 extending from the body of the drill less the length of the attachment body 11, 21. Also, the vanes 17, 22 can be further shaped to improve the vortex like effect and need not be planar but have an aerodynamic shape. If the vortex effect is of prime importance the end of the attachment body 11 opposite the open end 12 can include aeration holes over which a filter is placed so as to allow an increase in the vortex flow without reaching a critical internal pressure but still entrapping the dust and expelled material in the attachment body.

From the foregoing description relating to the exemplary embodiments of the drill attachment of the present invention, it should be readily understood that a methodology is also provided for collecting dust or other expelled material during drilling operations. According to the methodology, an attachment body, which may preferably be in the form of a substantially cylindrically configured skirt, is provided with an internal vortex structure having a plurality of vanes adapted to contact an appropriately sized drill bit so that the drill attachment may be supported for relative movement with the drill bit during drilling operations. The methodology incorporates a step of rotating the drill bit within a workpiece whereby the attachment body rotates relative to and concurrently with the drill bit at a rotational speed that is at or less than the speed of rotation of the drill bit. The methodology also includes the step of creating an airflow effect tending to draw the material being expelled by the drill bit into the interior of the skirt, and specifically directing the expelled material into collection regions defined by the plurality of vanes of the vortex structure, thereby to entrap the expelled material into the interior of the attachment body. The methodology may also include the step of allowing the attachment body to travel downwardly relative to the drill bit in a longitudinal direction therealong as the drill bit travels into the workpiece being drilled, thereby to provide a clearance for the end of the drill bit.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiments of the present invention without departing from the inventive concepts contained herein

I claim:

1. A drill attachment for mounting on a drill bit of a power drill to catch dust and debris expelled by the drilling action, the drill attachment comprising:

(a) an open topped container with a mounting opening opposite the open top and sized to fit closely around a drill bit received therein, the drill bit able to extend to the open top through which the bit protrudes in the drilling action; and (b) a plurality of vanes extending from the inner sides and bottom of the open topped container and extending offset to radial lines extending towards the center of the container, said vanes being of an at least partially resilient material, and sized and shaped to allow rotation of the drill attachment by at least partial engagement with the drill bit during the drilling, said rotation forming at least a partial vortex to assist entrapment of the dust and debris in the drill attachment.

2. A drill attachment for mounting on a drill bit of a power drill, and comprising a substantially hollow closed attachment body, the attachment body having:

(a) a mounting opening at a first longitudinal end, for mounting the attachment body on a drill bit;

(b) a larger dust catchment opening at an opposite second end through which the drill bit can protrude; and (c) the attachment body further including a plurality of spaced vanes extending from one or more of the internal surfaces of the attachment body and forming a central channel for receiving the drill bit, and the vanes assisting alignment of the attachment body around the drill bit and extending from the mounting opening to the dust catchment opening.

3. The drill attachment according to claim 2 wherein the mounting opening is formed of a resilient material to provide at least a partial grip on the drill bit.

4. The drill attachment according to claim 2 wherein the inner structure of the attachment body includes engagement means defining a portion of the central channel to assist substantial coaxial alignment of the attachment body around the drill bit.

5. The drill attachment according to claim 2 wherein the plurality of vanes extend longitudinally from internal sides of the attachment body partially into the central channel allowing a portion of each vane to engage the drill bit such that rotation of the drill bit causes movement of the attachment body relative to the drill bit.

6. The drill attachment according to claim 5 wherein the larger dust catchment opening of the attachment body extends normal to the central channel so as to engage a work surface and assist relative rotation of the attachment body and translational movement from the drill bit, and wherein the attachment body has a length which is sized less than that of the drill bit extending from the drill.

7. The drill attachment according to claim 5 wherein a side part of the plurality of the vanes, at or near a respective free end, extend to the central channel and are able to provide contact with the drill bit to assist rotation of the attachment body around the drill bit.

8. The drill attachment according to claim 5 wherein the free ends of the vanes are located at or near the channel and have a degree of flexibility to provide a resilient grip on the drill bit without preventing rotation of the drill bit.

9. The drill attachment according to claim 5 wherein the vanes are shaped and positioned to provide a vortex-like action to assist entrapment of dust particles in the attachment body.

10. The drill attachment according to claim 6 wherein the mounting opening is formed of a resilient material to provide a grip on the drill bit.

11. The drill attachment according to claim 6 wherein the attachment body include further internal engagement means to ensure substantial coaxial alignment of the attachment body around the drill bit.

* * * * *